W. A. L. MILLER.
FISHING SPOON.
APPLICATION FILED APR. 11, 1910.
982,974.
Patented Jan. 31, 1911.
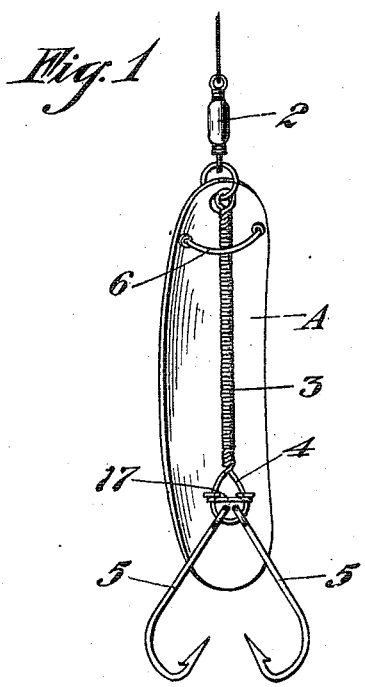
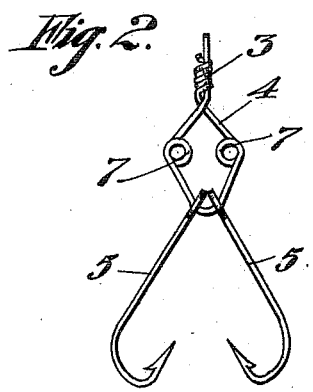
WITNESSES:
R. S. Berry,
R. A. Leonard.
INVENTOR
William A. L. Miller.
BY G. H. Strong.
ATTORNEY

UNITED STATES PATENT OFFICE.

WILLIAM A. L. MILLER, OF SAN FRANCISCO, CALIFORNIA.

FISHING-SPOON.

982,974.  Specification of Letters Patent.  Patented Jan. 31, 1911.

Application filed April 11, 1910. Serial No. 554,855.

*To all whom it may concern:*

Be it known that I, WILLIAM A. L. MILLER, a citizen of the United States, residing in the city and county of San Francisco and State of California, have invented new and useful Improvements in Fishing-Spoons, of which the following is a specification.

My invention relates to improvements in spoons, such as are employed for fishing either by trolling or other means.

It consists in the combination of parts and details of construction whereby the hooks are retained in relative position to the spoon, and whereby they are prevented from being displaced and put out of use by becoming entangled.

Referring to the accompanying drawings,—the ordinary attachment of fishing hooks with relation to the spoon is such that the hooks have an unlimited movement, and may be thrown over to the wrong side of the spoon, and they are also capable of being so far twisted upon their supporting link as to become entangled, and not in position for use.

It is the object of my invention to overcome these difficulties.

A represents a spoon of any suitable or desired structure having at the upper end a loosely attached swivel link 2, one end of which is loosely connected with one end of the spoon, and the other end is provided with means for the attachment of the line. From the attachment of this link to the spoon an indestructible and sufficiently flexible link or bar 3 extends downwardly along the length of the spoon, and has at the lower end a closed loop 4 with which the hooks 5 are loosely connected so that the hooks extend slightly below the opposite end of the spoon. With this connection there is nothing to prevent the hooks from being thrown away from the spoon, and even thrown over from the concave to the convex side thereof.

In my invention I form a loop or guard 6 which is fixed to the concave side of the spoon, near the upper end, and the attachment of the link 3. This guard is sufficiently long transversely and sufficiently open in its arch to allow a very considerable movement of the hook-connecting link to either side, and to a certain distance outwardly away from the spoon, but not sufficient to allow the hooks to be thrown over to the opposite side of the spoon. This device insures the hook-connecting link remaining in proper relation with the spoon, and limits the distance to which it may be thrown directly outward therefrom as is well shown in Fig. 1.

In order to prevent the hooks from being moved so far within the loop 4 to which they are loosely suspended as to become entangled or locked out of position for use, I have shown stops fixed across or to the sides of the loop which will act to limit the movement of the shanks of the hook with relation thereto. As shown in Fig. 1 this stop may consist of a bar 17 extending transversely across the diameter of the loop 4.

In Fig. 2 I have shown the stop formed by making a full turn on each of the sides of the loop, and these turns are sufficiently larger than the eye of the hook shank to prevent its passing upward beyond them. These stops are indicated at 7, and while the hooks may swing freely around the lower part of the loop 4, they cannot be thrown upwardly so far as to become entangled or put out of use.

Having thus described my invention, what I claim and desire to secure by Letters Patent is—

1. The combination with a fishing spoon, of a swivel connection with one end of the spoon, a link loosely connected with the swivel and having a loop with hooks loosely suspended therefrom, guards or stops to limit the outward movements of the hooks about their points of suspension, and a guard loop upon the spoon to limit the movement of the link.

2. The combination with a fishing spoon, of a swivel connection with one end of the spoon, a link loosely connected with the swivel, an arched guard fixed to the spoon through which the link passes, hooks loosely suspended from the link, and stops or guards upon the link to limit the movements of the hooks.

3. The combination with a fishing spoon, a swivel connection between the line and one end of the spoon, a link extending therefrom along the concaved side, and having an open loop at the lower end, and hooks, the shanks of which are loosely connected with said loop, of a guard fixed transversely across the loop, and an arched guard extending across the concaved surface of the spoon contiguous to the swivel connection.

In testimony whereof I have hereunto set my hand in the presence of two subscribing witnesses.

WILLIAM A. L. MILLER.

Witnesses:
RAYMOND A. LEONARD,
CHARLES EDELMAN.